United States Patent [19]

Sugio et al.

[11] 4,086,128

[45] Apr. 25, 1978

[54] PROCESS FOR ROUGHENING SURFACE OF EPOXY RESIN

[75] Inventors: Akitoshi Sugio, Omiya; Yukiya Masuda, Urawa; Toshihiko Kobayashi, Showamachi; Koichi Nakano; Tsukasa Sawai, both of Tokyo, all of Japan

[73] Assignee: Mitsubishi Gas Chemical Company, Inc., Tokyo, Japan

[21] Appl. No.: 773,437

[22] Filed: Mar. 2, 1977

[30] Foreign Application Priority Data

Mar. 4, 1976 Japan .................................. 51-23599
Apr. 9, 1976 Japan .................................. 51-40052

[51] Int. Cl.² ................ B29C 17/08; C09K 13/04
[52] U.S. Cl. ................ 156/668; 156/632; 156/655; 204/30; 252/79.2; 427/98; 427/306; 427/307
[58] Field of Search ............ 204/30, 32 R; 427/98, 427/306, 307, 322; 252/79.1, 79.2; 156/307, 308, 629, 630, 632, 646, 654, 655, 663, 668, 901, 902

[56] References Cited

U.S. PATENT DOCUMENTS 3,553,085  1/1971  Heymann ........................... 252/79.2
3,808,028  4/1974  Lando ............................. 156/668 X

*Primary Examiner*—William A. Powell
*Assistant Examiner*—Thomas Bokan
*Attorney, Agent, or Firm*—Armstrong, Nikaido, Marmelstein & Kubovcik

[57] ABSTRACT

Epoxy resin is pretreated with an organic solvent such as furfuryl alcohol, methyl alcohol, ethyl alcohol, n-propyl alcohol, iso-propyl alcohol, formic acid, acetic acid, propionic acid, butyric acid, methyl formate, ethyl formate, propyl formate, methyl acetate, ethyl acetate, propyl acetate, methyl propionate, ethyl propionate, propyl propionate, methyl butyrate, ethyl butyrate, propyl butyrate, acetone, diethyl ketone, dipropyl ketone, methylethyl ketone, diisopropyl ketone, methylpropyl ketone, ethylpropyl ketone, acetonitrile and nitromethane as a pretreating solution, and the pretreated resin is then etched with an etching solution containing hydrogen peroxide or a persulfate and sulfuric acid, or the resin is pretreated with an organic solvent containing furfuryl alcohol, methyl alcohol, ethyl alcohol, n-propyl alcohol or isopropyl alcohol, and formamide or ethylene glycol, 1,2-propylene glycol or glycerine, and the pretreated resin is etched with an etching solution containing hydrogen peroxide and sulfuric acid to roughen the surface of the resin. A good adhesiveness is obtained between the surface of the resin and a film of metal when the resin is coated with a metal.

28 Claims, No Drawings

PROCESS FOR ROUGHENING SURFACE OF EPOXY RESIN

This invention relates to a process for roughening a surface of epoxy resin.

Epoxy resin has excellent electrical and mechanical properties, and is widely used in various applications. Among the applications, it has been so far highly desired to form a metallic film having a high adhesiveness on the surface of shaped articles of the epoxy resin.

Generally, a metallic film is formed on a surface of resin by vapor deposition, electroless plating, a combination of electroless plating and electrolytic plating, etc. When a metallic film is formed according to any one of these procedures, it is necessary to roughen the surface of resin before forming the metallic film to provide a high adhesiveness between the resin and the metallic film.

The following procedures have been so far available for roughening the surface of resin: (1) a procedure for physically roughening the surface of resin, (2) a procedure for roughening the surface of resin by a mixed solution of chromic acid and sulfuric acid, etc. However, in the case of procedure (1), a treating cost is high, and in many cases there is such a disadvantage that the physical properties of resin are deteriorated by the treatment. In the case of procedure (2), there are such disadvantages as pollution of working environment by chromic acid and complication of a facility for treating a waste effluent, etc. Thus, any of these procedures is not always satisfactory.

As a result of extensive studies to overcome these disadvantages of the prior art procedures for roughening the surface of resin, the present inventors have found that the surface of epoxy resin can be roughened by pretreating the epoxy resin with some organic solvent at first, and then etching the pretreated epoxy resin with a solution containing hydrogen peroxide, or a persulfate, and sulfuric acid. The present inventors have also found that, when a film of metal, etc. is formed on the resulting epoxy resin having the roughened surface, a high adhesiveness can be obtained between the resin and the film.

The present invention provides a process for roughening a surface of epoxy resin, which comprises pretreating an epoxy resin with (1) an organic solvent comprising at least one compound selected from the group consisting of:

(a) a compound represented by the general formula, $R_1$—OH, wherein $R_1$ is an alkyl group or furfuryl group, (b) a compound represented by the general formula,

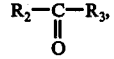

wherein $R_2$ is a hydrogen atom, or an alkyl group, $R_3$ is an alkyl group, an alkoxyl group, or a hydroxyl group, and when $R_2$ is a hydrogen atom, $R_3$ is an alkoxyl group or a hydroxyl group, and (c) a compound represented by the general formula, $CH_3$—X, wherein X is a nitrile group, or a nitro group, or (2) an organic solvent comprising:

(a) a compound represented by the general formula, $R_1$—OH, wherein $R_1$ has the same meaning as defined above, and (d) at least one compound selected from the group consisting of formamide and a polyhydric alcohol (the organic solvent will be hereinafter referred to as "pretreating solution"), and then etching the resulting pretreated epoxy resin with a solution containing hydrogen peroxide and sulfuric acid (the solution will be hereinafter referred to as "etching solution").

The present invention furthermore provides a process for roughening a surface of epoxy resin, which comprises pretreating an epoxy resin with an organic solvent comprising at least one compound selected from the group consisting of:

(a) a compound represented by the general formula, $R_1$—OH, wherein $R_1$ is an alkyl group or furfuryl group, (b) a compound represented by the general formula,

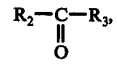

wherein $R_2$ is a hydrogen atom, or an alkyl group, $R_3$ is an alkyl group, an alkoxyl group, or a hydroxyl group, and when $R_2$ is a hydrogen atom, $R_3$ is an alkoxyl group or a hydroxyl group, and (c) a compound represented by the general formula, $CH_3$—X, wherein X is a nitrile group, or a nitro group, then etching the resulting pretreated epoxy resin with a solution containing a persulfate and sulfuric acid (the solution will be hereinafter referred to as "etching solution").

The epoxy resin used in the present invention is the well known epoxy resin, and means polymeric compounds containing at least two epoxy groups in one molecule, and synthetic resins formed by ring-opening reaction of the epoxy groups of the compounds.

The epoxy resin is not only single, but also includes modified epoxy resin. The modified epoxy resin must contain at least 25% by weight of epoxy resin.

Shaped articles of the epoxy resin to be used in the present invention can be made in any manner, so long as the shaped articles have exposed surfaces of the epoxy resin.

The shaped articles of the epoxy resin to be used in the present invention will be illustrated below in detail, but are not restricted thereto. The shaped articles of the epoxy resin to be used in the present invention are such glass-epoxy resin boards shaped by compression molding, injection molding, casting molding, extrusion molding, lamination molding, etc. Furthermore, they include shaped articles prepared by coating the epoxy resin on surfaces of various synthetic resin, metal, glass, ceramics, etc., and curing the resin.

The shaped articles of the epoxy resin contain glass fibers, paper, synthetic fibers, carbon black, alumina powders, silica powders, wax, etc. as filler, pigment, mold release agent, reinforcing agent, etc., or can be used together with phenol resin, urea resin, melamine resin, etc. or modified epoxy resin with silicone, ester resins, etc. can be also used.

The pretreating solution used in the present invention comprises an organic solvent of at least one of organic compounds (a), (b) and (c), or an organic solvent comprising the compound (a) and at least one of the compounds (d). When $R_1$, $R_2$, and $R_3$ of the compounds (a), and (b) are alkyl groups, it is preferable that the alkyl groups have not more than three carbon atoms. When $R_3$ of the compound (b) is an alkoxyl group, it is preferable that the alkoxyl group has not more than three carbon atoms.

Examples of an organic solvent are furfuryl alcohol, methyl alcohol, ethyl alcohol, n-propyl alcohol, isopropyl alcohol, formic acid, acetic acid, propionic acid, butyric acid, methyl formate, ethyl formate, propyl formate, methyl acetate, ethyl acetate, propyl acetate, methyl propionate, ethyl propionate, propyl propionate, methyl butyrate, ethyl butyrate, propyl butyrate, acetone, diethyl ketone, dipropyl ketone, methylethyl ketone, diisopropyl ketone, methyl propyl ketone, ethyl propyl ketone, acetonitrile and nitromethane.

Preferable examples of the organic compounds are methyl alcohol, ethyl alcohol, n-propyl alcohol, furfuryl alcohol, formic acid, acetic acid, methyl formate, ethyl formate, acetone, methylethyl ketone, acetonitrile, nitromethane, etc.

As to the polyhydric alcohol of the organic compounds (d), polyhydric alcohols having 2 to 3 carbon atoms are preferable. Preferable examples of the compounds (d) are formamide, ethylene glycol, 1,2-propylene glycol, glycerine, etc.

A mixing ratio of the compound (a) to the compound (d) is 1:0.1 to 10 by volume. A mixing ratio of the compound (a) to the compound (d) of 1:less than 0.1 by volume is not preferable, since a substantial effect as the pretreating solution based on the mixture of the compounds (a) and (d) is lost. A mixing ratio of the compound (a) to the compound (d) of 1:more than 10 by volume is also not preferable, since the effect as the pretreating solution is reduced.

It is possible to use the organic compounds as such as the pretreating solution, but is also possible to use them in mixture of water. When the organic compounds are used in mixture with water, the concentration of the organic compounds in the aqueous solution is not particularly restricted, but usually is at least 15% by volume. Too low a concentration of the organic compound is not preferable, since the effect of pretreatment with the pretreating solution is reduced.

When an aqueous solution containing hydrogen peroxide and sulfuric acid is used as the etching solution of the present invention, usually a concentration of hydrogen peroxide is at least 1 W/V % (where the expression "W/V %" indicates grams of hydrogen peroxide in 100 ml of its aqueous solution, and will be hereafter applied to designation of the concentration), and a concentration of sulfuric acid is at least 30% by volume. Preferable concentration of hydrogen peroxide is 7 to 20 W/V % and that of sulfuric acid is 40 to 70% by volume.

When an aqueous solution containing a persulfate and sulfuric acid is used as the etching solution of the present invention, usually a concentration of persulfate is at least 1 W/V % (the expression "W/V %" indicates grams of persulfate in 100 ml of its aqueous solution, and will be hereafter applied to designation of the concentration), and a concentration of sulfuric acid is at least 30% by volume. Preferable concentration of persulfate is 10 to 50 W/V %, and that of sulfuric acid is 30 to 70% by volume. Examples of the persulfate are ammonium persulfate, sodium persulfate, potassium persulfate, etc. Preferable example of the persulfate is ammonium persulfate.

In the present invention, the pretreatment is carried out by dipping the epoxy resin in said pretreating solution, or by contacting the epoxy resin with vapors of said pretreating solution, or by spraying said pretreating solution onto the epoxy resin.

Temperature of the pretreating solution and the pretreating time are not particularly restricted, and are appropriately selected in view of the kind of the pretreating solution and other pretreating conditions, but usually the pretreating temperature is in a range of 20° C to a boiling point of the pretreating solution, and the pretreating time is in a range of 3 to 60 minutes.

When the pretreating is carried out insufficiently, the surface of epoxy resin is not fully roughened even after the etching with the etching solution, and a peeling strength of a film becomes low when a film of metal, etc. is formed on the resin. When the pretreatment is carried out excessively to the contrary, the surface of the resin is so roughened that a finished surface of the film becomes poor.

The epoxy resin pretreated with the pretreating solution is preferably washed with water before the etching with the etching solution.

In the present invention, the pretreated epoxy resin is etched by dipping the epoxy resin into the etching solution, or by spraying the etching solution onto the resin. Temperature of the etching solution and treating time are not particularly restricted, and are appropriately selected in view of the kind of the pretreating solution and other conditions. Usually, the etching temperature is 30° to 80° C, and the etching time is 3 to 60 minutes.

When the etching is carried out insufficiently, the surface of epoxy resin is not much roughened, and consequently a peeling strength of a film of metal, etc. becomes low. When the etching is carried out excessively to the contrary, a finished surface of the film becomes poor.

The epoxy resin whose surface has been roughened according to the present invention is then passed through steps of bonding, coating, plating, after sensitizing by use of an aqueous tin chloride solution and the like, and then the sensitized surface of the epoxy resin is activated by means of palladium chloride and the like. The epoxy resin whose surface has been roughened according to the present invention is particularly suitable as materials on which films of metal are formed by vacuum vapor deposition, electroless plating or a combination of electroless plating and electrolytic plating.

According to the present invention, a good workability can be obtained in the pretreating when the pretreating is carried out with the pretreating solution of (a), (b) or (c), and when the pretreatment is carried out with the pretreating solution comprising the compound (a) and at least one of the compound (d), and the etching is carried out with an etching solution of hydrogen peroxide and sulfuric acid, the surface of epoxy resin can be very finely roughened, and thus the roughened surface of epoxy resin is hardly damaged by scratching. When the roughed surface of epoxy resin is coated with metal, etc., a smooth coating surface can be obtained, even if the coating film is thin, and a uniform peeling strength of the film can be obtained. That is, a metal-coated board having a good peeling strength can be obtained according to the present invention.

To remove the fouling of the shaped articles, it is preferable to wash the shaped article with a neutral detergent or water before the pretreating. To remove the pretreating solution before the etching, it is preferable to wash the shaped article with water, and to remove the etching solution after the etching it is preferable to wash the shaped article with water.

Furthermore, no etching solution containing chromic acid and sulfuric acid as in the prior art is used in the present invention for roughening the surface of epoxy resin, and thus the present invention provides a process with a good improvement of the working environment or a good prevention of environmental pollution.

Now, the present invention will be described in detail, referring to Examples, but will not be, of course, limited to these Examples.

In Examples % is percent by weight, unless otherwise specified. The peeling strength and surface hardness in Examples were measured according to JIS-C-6481, and pencil scratching test of JIS-K-5400, respectively.

EXAMPLE 1

A glass-epoxy resin board (trade-mark GEP-130, board prepared by impregnating glass fiber fabrics as a substrate with epoxy resin, followed by lamination molding, a product made by Mitsubishi Gas-Chemical Co., Ltd., Japan, size: 40 × 100 × 1.6 mm) was sufficiently washed with a neutral detergent, and then with water. Then, the board was dipped in methanol as a pretreating solution at 40° C for 30 minutes, and then washed with water. Then, the board was dipped in an etching solution consisting of 400 ml of 35% $H_2O_2$, 500 ml of 98% $H_2SO_4$ and 100 ml of $H_2O$ at 40° C for 30 minutes, and washed with water, thereby roughening the surface of the board.

Then, the board with the roughened surface was dipped in an aqueous solution of tin chloride sensitizer consisting of 15 g of $SnCl_2 \cdot 2H_2O$, 20 ml of 35% HCl, and 980 ml of $H_2O$ at 20° C for 5 minutes, then washed with water, dipped into an aqueous solution of palladium chloride activator consisting of 0.25 g of $PdCl_2$, 5 ml of 35% HCl and 995 ml of $H_2O$ at 20° C for 3 minutes, and washed with water.

Then, the board was dipped in an electroless plating solution (Copper Mix 328 made by Shiprey Co. USA, consisting of 100 ml of solution A, 100 ml of solution B and 800 ml of $H_2O$) at 30° C for 20 minutes, thereby coating the board with metal.

Then, the metal-coated board was electroplated in a copper sulfate plating solution containing 210 g/l of $CuSO_4 \cdot 5H_2O$, 60 g/l of 98% $H_2SO_4$, 0.012 g/l of 35% HCl, 0.01 g/l of dextrin, and 0.01 g/l of urea under 3.5 A for 90 minutes, washed with water, and dried at 120° C for 1 hour, whereby the metal-coated board was obtained. Peeling strength of the metal coating film was 2.0 kg/cm.

EXAMPLE 2

Surface of the same glass-epoxy resin board as used in Example 1 was roughened in the same manner as in Example 1, except that acetonitrile was used as the pretreating solution in place of the methanol.

The resulting board with the roughened surface was further treated in the same manner as in Example 1, thereby obtaining a metal-coated board. Peeling strength of the metal coating film was 1.5 kg/cm.

EXAMPLE 3

The same glass-epoxy resin board as used in Example 1 was sufficiently washed with a neutral detergent, washed with water, dipped in acetonitrile as the pretreating solution at 40° C for 30 minutes, and then washed with water. Then, the board was dipped in an etching solution consisting of 300 g of $(NH_4)_2S_2O_8$, 500 ml of 98% $H_2SO_4$ and 500 ml of $H_2O$ at 40° C for 30 minutes, and washed with water, thereby roughening the surface of the board.

The resulting board with the roughened surface was further treated in the same manner as in Example 1, thereby obtaining a metal-coated board. Peeling strength of the metal coating film was 1.5 kg/cm.

EXAMPLE 4

Surface of the same glass-epoxy resin board was roughened in the same manner as in Example 1, except that an aqueous 85% formic acid solution was used as the pretreating solution in place of methanol.

The resulting board with the roughened surface was further treated in the same manner as in Example 1, thereby obtaining a metal-coated board. Peeling strength of the metal coating film was 1.3 kg/cm.

EXAMPLE 5

Surface of the same glass-epoxy resin board as used in Example 1 was roughened in the same manner as in Example 1, except that an aqueous 50% furfuryl alcohol solution was used as the pretreating solution in place of methanol.

The resulting board with the roughened surface was further treated in the same manner as in Example 1, thereby obtaining a metal-coated board. Peeling strength of the metal coating film was 0.8 kg/cm.

EXAMPLE 6

Surface of the same glass-epoxy resin board as used in Example 1 was roughened in the same manner as in Example 1, except that an aqueous 80% acetone solution was used as the pretreating solution in place of methanol.

The resulting board with the roughened surface was further treated in the same manner as in Example 1, thereby obtaining a metal-coated board. Peeling strength of the metal coating film was 1.4 kg/cm.

EXAMPLE 7

Surface of the same glass-epoxy resin board as used in Example 3 was roughened in the same manner as in Example 3, except that methyl ethyl ketone was used as the pretreating solution in place of acetonitrile.

The resulting board with the roughened surface was further treated in the same manner as in Example 1, thereby obtaining a metal-coated board. Peeling strength of the metal coating film was 1.6 kg/cm.

EXAMPLE 8

The same glass-epoxy resin board as used in Example 1 was sufficiently washed with a neutral detergent, washed with water, brought into contact with vapors of ethyl formate at 60° C for 10 minutes, and then washed with water. Then, the board was dipped in an etching solution consisting of 400 ml of 35% $H_2O_2$, 500 ml of 98% $H_2SO_4$, and 100 ml of $H_2O$ at 40° C for 30 minutes, and washed with water, thereby roughening the surface of the board.

The resulting board with the roughened surface was further treated in the same manner as in Example 1, thereby obtaining a metal-coated board. Peeling strength of the metal coating film was 1.4 kg/cm.

EXAMPLE 9

The same glass-epoxy resin board as used in Example 1 was sufficiently washed with a neutral detergent, washed with water, brought into contact with vapors of methyl formate at 40° C for 10 minutes, and then washed with water. Then, the board was dipped into an etching solution consisting of 300 g of $(NH_4)_2S_2O_8$, 500 ml of 98% $H_2SO_4$ and 500 ml of $H_2O$ at 40° C for 30 minutes, and washed with water, thereby roughening the surface of the board.

The resulting board with the roughened surface was further treated in the same manner as in Example 1, thereby obtaining a metal-coated board. Peeling strength of the metal coating film was 1.1 kg/cm.

EXAMPLE 10

The same glass-epoxy resin board as used in Example 1 was sufficiently washed with a neutral detergent, washed with water, and sprayed with ethanol at 40° C for 15 minutes through a spray nozzle, and washed with water. The board was then sprayed with an etching solution consisting of 400 ml of 35% $H_2O_2$, 500 ml of 98% $H_2SO_4$ and 100 ml of $H_2O$ at 40° C for 15 minutes, and washed with water, thereby roughening the surface of the board.

The resulting board with the roughened surface was further treated in the same manner as in Example 1, thereby obtaining a metal-coated board. Peeling strength of the metal coating film was 0.7 kg/cm.

EXAMPLE 11

Surface of the same glass-epoxy resin board as used in Example 1 was roughened in the same manner as in Example 10, except that nitromethane was used as the pretreating solution in place of methanol.

The resulting board with the roughened surface was further treated in the same manner as in Example 1, thereby obtaining a metal-coated board. Peeling strength of the metal coating film was 1.0 kg/cm.

EXAMPLE 12

The same glass-epoxy resin board as used in Example 1 was sufficiently washed with a neutral detergent, washed with water, and sprayed with an aqueous 80% acetic acid solution at 40° C for 15 minutes through a spray nozzle, and washed with water. Then, the board was sprayed with an etching solution consisting of 400 g of $(NH_4)_2S_2O_8$, 500 ml of 98% $H_2SO_4$ and 500 ml of $H_2O$ at 40° C for 15 minutes, and washed with water, thereby roughening the surface of the board.

The resulting board with the roughened surface was further treated in the same manner as in Example 1, thereby obtaining a metal-coated board. Peeling strength of the metal coating film was 1.2 kg/cm.

EXAMPLE 13

The same glass-epoxy resin board as used in Example 1 was sufficiently washed with a neutral detergent, washed with water, dipped in an aqueous solution consisting of 50% by volume of furfuryl alcohol, 30% by volume of formamide, and 20% by volume of water at 60° C for 15 minutes, and washed with water. Then, the board was dipped in the same etching solution as used in Example 1 and washed with water in the same manner as in Example 1, thereby roughening the surface of the board.

Then, the board was dipped into the same aqueous solution of tin chloride sensitizer as used in Example 1, washed with water, dipped into the same electroless plating solution as used in Example 1 in the same manner as in Example 1, thereby coating the board with metal.

Then, the resulting metal-coated board was electroplated in the same copper sulfate plating solution as used in Example 1 under 3.5 A for 60 minutes, washed with water, and dried at 120° C for 1 hour, thereby obtaining a metal-coated board.

The resulting metal-coated board had a smooth metal-coated surface, and peeling strength of the metal coating film was 1.8 kg/cm on average. Surface hardness of the glass-epoxy resin board with the roughened surface before the plating was 4 H.

EXAMPLE 14

Surface of the same glass-epoxy resin board as used in Example 13 was roughened in the same manner as in Example 13, except that an aqueous solution consisting of 30% by volume of furfuryl alcohol and 70% by volume of glycerin was used as the pretreating solution in place of the furfuryl alcohol-formamide solution.

The resulting board with the roughened surface was further treated in the same manner as in Example 13, thereby obtaining a metal-coated board.

The resulting metal-coated board had a smooth metal-coated surface, and peeling strength of the metal coating film was 1.5 kg/cm on average. Surface hardness of the glass-epoxy resin board with the roughened surface before the plating was 4 H.

EXAMPLE 15

Surface of the same glass-epoxy resin board as used in Example 13 was roughened in the same manner as in Example 13, except that a solution consisting of 50% by volume of methanol and 50% by volume of ethylene glycol was used as the pretreating solution in place of the furfuryl alcohol-formamide solution.

The resulting board with the roughened surface was further treated in the same manner as in Example 13, thereby obtaining a metal-coated board.

The resulting metal-coated board had a smooth metal-coated surface, and peeling strength of the metal coating film was 2.3 kg/cm on average. Surface hardness of the glass-epoxy resin board with the roughened surface before the plating was 4 H.

EXAMPLE 16

Surface of the same glass-epoxy resin board as used in Example 13 was roughened in the same manner as in Example 13, except that a solution consisting of 80% by volume of methanol and 20% by volume of glycerin was used as the pretreating solution in place of the furfuryl alcohol-formamide solution.

The resulting board with the roughened surface was further treated in the same manner as in Example 13, thereby obtaining a metal-coated board.

The resulting metal-coated board had a smooth metal-coated surface, and peeling strength of the metal coating film was 2.1 kg/cm on average. Surface hardness of the glass-epoxy resin board with the roughened surface before the plating was 4 H.

EXAMPLE 17

Surface of the same glass-epoxy resin board as used in Example 13 was roughened in the same manner as in Example 13, except that a solution consisting of 70% by volume of methanol and 30% by volume of propylene glycol was used as the pretreating solution in place of the furfuryl alcohol-formamide solution.

The resulting board with the roughened surface was further treated in the same manner as in Example 13, thereby obtaining a metal-coated board.

The resulting metal-coated board had smooth metal-coated surface and peeling strength of the metal coating film was 2.0 kg/cm on average, and surface hardness of the glass-epoxy resin board with the roughened surface before the plating was 4 H.

EXAMPLE 18

The same glass-epoxy resin board as used in Example 1 was sufficiently washed with a neutral detergent, washed with water, sprayed with a solution consisting of 90% by volume of ethanol and 10% by volume of formamide at 40° C for 60 minutes through a spray nozzle, and washed with water. Then, the board was sprayed with an etching solution consisting of 400 ml of 35% $H_2O_2$, 500 ml of 98% $H_2SO_4$, and 100 ml of water at 40° C for 30 minutes through a spray and washed with water, thereby roughening the surface of the board.

The resulting board with the roughened surface was further treated in the same manner as in Example 13, thereby obtaining a metal-coated board.

The resulting metal-coated board had a smooth metal-coated surface, and peeling strength of the metal coating film was 1.3 kg/cm on average. Surface hardness of the glass-epoxy resin board with the roughened surface before the plating was 4 H.

EXAMPLE 19

Surface of the same glass-epoxy resin board as used in Example 18 was roughened in the same manner as in Example 18, except that a solution consisting of 60% by volume of ethanol and 40% by volume of ethylene glycol was used as the pretreating solution in place of the ethanol-formamide solution.

The resulting board with the roughned surface was further treated in the same manner as in Example 13, thereby obtaining a metal-coated board.

The resulting metal-coated board had a smooth metal-coated surface, and peeling strength of the metal coating film was 1.2 kg/cm on average. Surface hardness of the glass-epoxy resin board with the roughened surface before the plating was 4 H.

EXAMPLE 20

Surface of the same glass-epoxy resin board as used in Example 18 was roughened in the same manner as in Example 18, except that n-propyl alcohol used as the pretreating solution in place of the ethanol-formamide solution.

The resulting board with the roughened surface was further treated in the same manner as in Example 13, thereby obtaining a metal-coated board.

The resulting metal-coated board had a smooth metal-coated surface, and peeling strength of the metal coating film was 0.8 kg/cm on average, and surface hardness of the glass-epoxy resin board with the roughened surface before the plating was H.

What is claimed is:

1. A process for roughening a surface of epoxy resin, which comprises pretreating an epoxy resin with (1) an organic solvent comprising at least one compound selected from the group consisting of:
   (a) a compound represented by the general formula, $R_1$—OH, wherein $R_1$ is an alkyl group or furfuryl group,
   (b) a compound represented by the general formula,

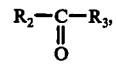

wherein $R_2$ is a hydrogen atom, or an alkyl group, $R_3$ is an alkyl group, an alkoxyl group, or a hydroxyl group, and when $R_2$ is a hydrogen atom, $R_3$ is an alkoxyl group or a hydroxyl group, and
   (c) a compound represented by the general formula, $CH_3$—X, wherein X is a nitrile group, or a nitro group, or
   (2) an organic solvent comprising:
   (a) a compound represented by the general formula, $R_1$—OH, wherein $R_1$ has the same meaning as defined above, and
   (d) at least one compound selected from the group consisting of formamide and a polyhydric alcohol as a pretreating solution, and then etching the resulting pretreated epoxy resin with an etching solution containing hydrogen peroxide and sulfuric acid.

2. A process according to claim 1, wherein the compounds (a), (b) and (c) have alkyl groups of not more than three carbon atoms as $R_1$, $R_2$ and $R_3$.

3. A process according to claim 1, wherein the compound (c) has an alkoxyl group of not more than three carbon atoms as $R_3$.

4. A process according to claim 1, wherein the compounds (a), (b) and (c) are furfuryl alcohol, methyl alcohol, ethyl alcohol, n-propyl alcohol, isopropyl alcohol, formic acid, acetic acid, propionic acid, butyric acid, methyl formate, ethyl formate, propyl formate, methyl acetate, ethyl acetate, propyl acetate, methyl propionate, ethyl propionate, propyl propionate, methyl butyrate, ethyl butyrate, propyl butyrate, acetone, diethyl ketone, dipropyl ketone, methyl ethyl ketone, diisopropyl ketone, methyl propyl ketone, ethyl propyl ketone, acetonitrile and nitromethane.

5. A process according to claim 1, wherein the compounds (a), (b) and (c) are furfuryl alcohol, methyl alcohol, ethyl alcohol, n-propyl alcohol, formic acid, acetic acid, methyl formate, ethyl formate, acetone, methylethyl ketone, acetonitrile and nitromethane.

6. A process according to claim 1, wherein the polyhydric alcohol has 2 to 3 carbon atoms.

7. A process according to claim 6, wherein the polyhydric alcohol is ethylene glycol, 1,2-propylene glycol or glycerin.

8. A process according to claim 1, wherein the pretreating solution is an aqueous solution containing at least 15% by volume of the organic compound.

9. A process according to claim 1, wherein a mixing ratio of the compound (a) to the compound (d) is 1:0.1 to 10 by volume.

10. A process according to claim 1, wherein the etching solution contains at least 1 W/V % of hydrogen peroxide and at least 30% by volume of sulfuric acid.

11. A process according to claim 1, wherein the pretreatment is carried out by dipping, by spraying or contacting with vapors of the pretreating solution.

12. A process according to claim 1, wherein the pretreatment is carried out at a temperature of 20° C to a boiling point of the pretreating solution for 3 to 60 minutes.

13. A process according to claim 1, wherein the epoxy resin is washed with water after the pretreatment.

14. A process according to claim 1, wherein the etching is carried out by dipping or spraying.

15. A process according to claim 1, wherein the etching is carried out at 30° to 80° C for 3 to 60 minutes.

16. A process for roughening a surface of epoxy resin, which comprises pretreating an epoxy resin with an organic solvent comprising at least one compound selected from the group consisting of:
(a) a compound represented by the general formula,
   $R_1$—OH, wherein $R_1$ is an alkyl group or furfuryl group,
(b) a compound represented by the general formula,

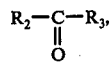

wherein $R_2$ is a hydrogen atom, or an alkyl group, $R_3$ is an alkyl group, an alkoxyl group, or a hydroxyl group, and when $R_2$ is a hydrogen atom, $R_3$ is an alkoxyl group or a hydroxyl group, and
(c) a compound represented by the general formula,
   $CH_3$—X, wherein X is a nitrile group, or a nitro group as a pretreating solution, and then etching the resulting pretreated epoxy resin with an etching solution containing a persulfate and sulfuric acid.

17. A process according to claim 16, wherein the compounds (a), (b) and (c) have alkyl groups of not more than three carbon atoms as $R_1$, $R_2$ and $R_3$.

18. A process according to claim 16, wherein the compound (c) has an alkoxyl group of not more than three carbon atoms as $R_3$.

19. A process according to claim 16, wherein the compounds (a), (b) and (c) are furfuryl alcohol, methyl alcohol, ethyl alcohol, n-propyl alcohol, iso-propyl alcohol, formic acid, acetic acid, propionic acid, butyric acid, methyl formate, ethyl formate, propyl formate, methyl acetate, ethyl acetate, propyl acetate, methyl propionate, ethyl propionate, propyl propionate, methyl butyrate, ethyl butyrate, propyl butyrate, acetone, diethyl ketone, dipropyl ketone, methylethyl ketone, diisopropyl ketone, methyl propyl ketone, ethyl propyl ketone, acetonitrile and nitromethane.

20. A process according to claim 16, wherein the compounds (a), (b) and (c) are furfuryl alcohol, methyl alcohol, ethyl alcohol, n-propyl alcohol, formic acid, acetic acid, methyl formate, ethyl formate, acetone, methylethylketone, acetonitrile, and nitromethane.

21. A process according to claim 16, wherein the pretreating solution is an aqueous solution containing at least 15% by volume of the organic compounds.

22. A process according to claim 16, wherein the etching solution contains at least 1 W/V % of persulfate and at least 30% by volume of sulfuric acid.

23. A process according to claim 22, wherein the persulfate is ammonium persulfate, sodium persulfate or potassium persulfate.

24. A process according to claim 16, wherein the pretreatment is carried out by dipping, by spraying, contacting with vapors of the pretreating solution.

25. A process according to claim 16, wherein the pretreatment is carried out at a temperature of 20° C to a boiling point of the pretreating solution for 3 to 60 minutes.

26. A process according to claim 16, wherein the epoxy resin is washed with water after the pretreatment.

27. A process according to claim 16, wherein the etching is carried out by dipping or spraying.

28. A process according to claim 16, wherein the etching is carried out at 30° to 80° C for 3 to 60 minutes.

* * * * *